Oct. 25, 1932.  H. MULLER  1,884,810
RELIEF VALVE
Filed Oct. 7, 1930
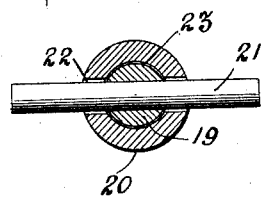
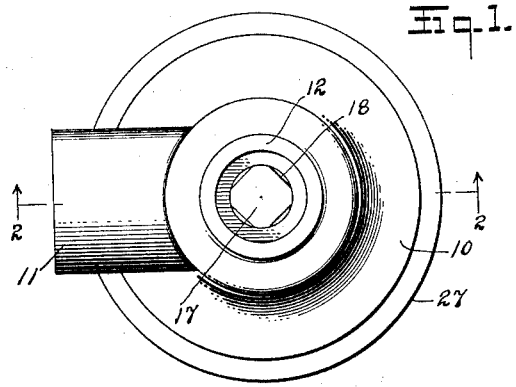
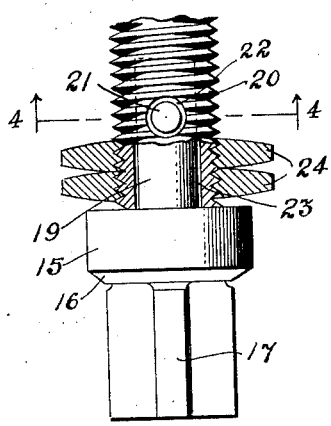
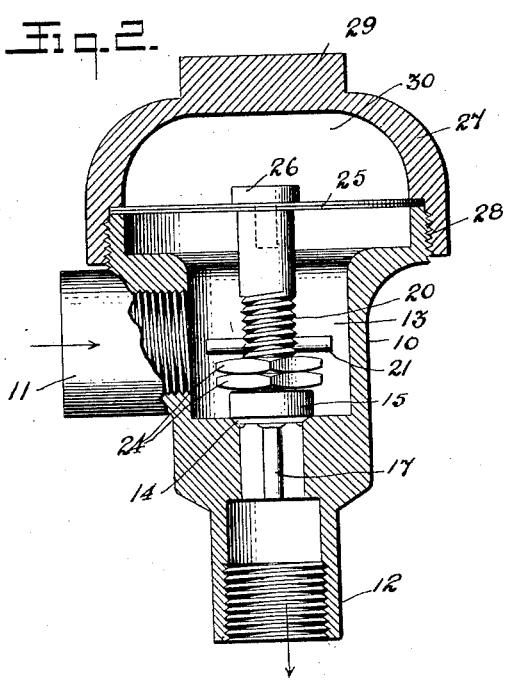
INVENTOR
Herman Müller.
HIS ATTORNEY.

Patented Oct. 25, 1932

1,884,810

UNITED STATES PATENT OFFICE

HERMAN MÜLLER, OF PHILADELPHIA, PENNSYLVANIA

RELIEF VALVE

Application filed October 7, 1930. Serial No. 486,924.

This invention relates to relief valves, and has for an object to provide a valve of the type embodying new and improved features and new principles of operation.

A further object of the invention is to provide in a relief valve, a valve held normally to its seat by a resilient diaphragm, with an air-cushion co-operating with said diaphragm for resisting the opening of the valve.

A further object of the invention is to provide in a relief valve, improved means for facilitating the seating of the valve.

The invention, therefore, comprises a housing having a valve seat and a valve co-operating therewith, said valve being connected through the medium of a stem with a diaphragm, with adjusting and locking means carried by the stem, and with an air-cushion upon the side of the diaphragm remote from the valve.

The invention is directed to other objects and possesses other features of novelty and advantage, some of which, together with the foregoing, will be hereinafter more fully set forth.

In the drawing:—

Figure 1 is a view of the relief valve in plan, seen from the point of view of the discharge port, Figure 2 is a transverse sectional view, substantially on a diameter, as indicated by line 2—2 of Figure 1, Figure 3 is an enlarged detail view of the valve and valve stem, and Figure 4 is a transverse sectional view taken on line 4—4 of Figure 3.

Like characters of reference indicate corresponding parts throughout the several views.

The improved relief valve, which forms the subject matter of this application, comprises a housing 10 having an inlet connection 11 and an outlet connection 12. These inlet and outlet connections communicate through an internal chamber 13, the bottom of which is provided with a valve seat 14.

A valve 15 is provided with proper contouring to fit the valve seat, here shown as a taper 16, but it is to be understood that the particular form of valve may be varied as circumstances may make desirable, and showing a taper upon the valve to fit a complementary taper of the seat is intended as no limitation. The valve carries a pilot 17, which provides passages 18 thereabout for the discharge of the fluid.

The valve stem is composite, comprising the shank 19, inserted into the axial bore of the threaded section 20. Both the shank 19 and the section 20 are provided with registering openings through which a pin 21 is inserted, the opening through the threaded section being larger than that through the shank, such difference in diameter being indicated at 22 in Figures 3 and 4. With the pin seated, as shown in the figures, a certain amount of looseness is thereby provided, the shank itself being smaller in diameter than the internal bore of the threaded section, providing an annular space 23, so that the valve accommodates itself to variations, resulting from unequal action of the diaphragm, to make a complete seat.

Lock nuts 24 are provided upon the threaded section 20, which may, as occasion requires, bear against the top of the valve 15, or against the pin 21, for holding these parts rigid, and for the purposes of adjustment.

The end of the section 20 abuts against the diaphragm 25 and is held in position by a rivet, or screw 26. As shown at Figure 2, this diaphragm 25 is composed of two thicknesses of resilient material. It is to be understood that the number of laminæ will be varied according to the resistance to be provided, such diaphragm providing a resistance to the opening of the valve 15.

The diaphragm 25 is held in air-tight relation upon the top of the housing 10 by means of a cap 27, threaded connection 28 being provided for accomplishing this air-tight connection. Preferably, a multi-angular part 29 is provided to receive a wrench, and the cap itself, when in position, will provide an air chamber, or pocket 30, above the diaphragm 25, adding the resistance of prisoned air to the resilient resistance of the diaphragm itself.

In operation, of course, the system to be relieved will be connected with the inlet 11 by a pipe in the usual manner, and the connection 12 may, if found desirable, be also connected with a pipe leading to sewerage, or other waste.

Water, or other fluid, introduced therefore through the inlet 11, into the chamber 13, will bear against the diaphragm 25, and when the pressure of such liquid is great enough to overcome the combined resistance of the diaphragm, and the aerostatic pressure within the pocket 30, the diaphragm will lift the valve 15 from its seat, and the fluid will flow outwardly through the discharge connection 12 to relieve the internal pressure.

As soon as pressure is returned to normal, the resiliency of the diaphragm 25, and the air within the pocket 30 will again seat the valve and interrupt further discharge.

Of course, the relief valve, herein illustrated, may be modified in various ways without departing from the invention herein set forth and hereinafter claimed.

The invention is hereby claimed as follows:

A relief valve organization comprising a housing, a diaphragm forming a chamber within the housing, said housing having inlet and outlet ports communcating with said chamber, a threaded sleeve carried by the diaphragm with a diametrical transecting opening, a valve adapted to close one port and having a shank loosely inserted within the sleeve, a pin smaller than the opening inserted through said opening and the shank and forming a loose connection, and nuts upon the sleeve adapted to electively engage the valve and pin and limit the relative movement of the valve and sleeve in two directions.

In testimony whereof I have signed my name to this specification.

HERMAN MÜLLER.